UNITED STATES PATENT OFFICE.

THOMAS G. BLACKLOCK, OF BROOKLYN, NEW YORK, ASSIGNOR TO PETER B. OLNEY, JR., TRUSTEE, OF NEW YORK, N. Y.

PROCESS OF MAKING DOUGH.

1,232,758.   Specification of Letters Patent.   Patented July 10, 1917.

No Drawing.   Application filed August 10, 1916. Serial No. 114,118.

*To all whom it may concern:*

Be it known that I, THOMAS G. BLACKLOCK, a citizen of the United States, residing at Brooklyn, in the county of Kings and State of New York, have invented certain new and useful Improvements in Processes of Making Dough, of which the following is a full, clear, and exact description.

The invention upon which is based the present application for Letters Patent is a new and valuable improvement in processes of making dough in which yeast is used as the leavening agent. The objects which I have had primarily in view in carrying out my invention are to reduce the length of time required for the production of ripe dough from its necessary ingredients; to produce a dough mixture which requires a relatively shorter period of time for its manufacture and at a lower temperature for the necessary fermentation, and generally, to reduce the cost of production and manufacture of bread and to increase the size of the loaves for a given weight of dough, and to produce a more desirable and nutritious article of food.

In carrying out my new process, I use, in the main, the ordinary ingredients which are commonly employed in bread making, but in preparing the dough in accordance with my invention I add to the materials a processed compound of farina and hominy in about equal proportions in a finely divided condition. The proportion which this compound may bear to the mixture of other ingredients may vary to some extent, but the best results I have found to be secured by the proportions given in the following formula for what is known in the art as a one gallon dough.

Formula.

2 ounces of yeast, 1 pound of processed compound, 11 lbs. of flour, 4 oz. of salt, 3 oz. of sugar, 2 oz. of shortening and 1 gal. of water.

In producing a dough composed of the above ingredients in the proportions stated I dissolve an ounce of the yeast in about one quart of water, and to this solution I add one half of the processed compound and ¼ oz. of salt with sufficient flour to make a stiff dough ball. I slit this ball open and immerse it in a receptacle containing substantially three quarts of water, being the amount of water which in addition to that already used makes up a one gallon dough.

In a comparatively few minutes after the dough has been immersed in this water, the combination of yeast, salt, water, dextrose and gelatinized starch and flour, set up a rapid yeast development and the dough ball is converted into a relatively light spongy mass and floats to the surface. When this occurs the spongy dough is broken up in the water, and flour, the balance of the processed compound, and the other above named ingredients are added, making a stiffer and drier dough than has heretofore been possible with the proportionate amount of flour specified in the above formula.

The entire mass of dough is then placed in the usual trough to ferment or rise in the usual way until it is in proper condition for baking. It is then scaled, molded into the proper shaped loaves and handled and baked in the usual way.

In explanation of the nature of the invention, and the actions which presumably result from the series of steps above outlined, I would say that what I have above referred to as the processed compound, is made as follows: I take farina and fine hominy, well known commercial products, in the above equal proportions and by the addition of water increase the amount of moisture which they normally contain to about 25%. This mixture is then passed through a double jacketed steam sterilizer, where it is agitated for about thirty minutes under a temperature beginning at 100° F. and running up not to exceed 180° F. as the material advances in the device. The hydrolysis of the starch proceeds during this process developing dextrose gelatinized starch and the intermediate products between gelatinized starch and dextrose and the composition is what is known in the art as processed.

This compound used in making up the dough ball and dough is intended to stimulate the yeast growth and to promote the formation of greater quantities of gas and alcohol in the mass of dough rapidly and at a lower temperature than has heretofore been permissible, and it effects the absorption of an optimum amount of water and creates a better proofing or expansion of the dough.

By its use I am enabled to use an increased amount of salt in proportion to the flour, less sugar as a fermenting agent and a smaller quantity of lard or shortening for conditioning the gluten of the flour.

By following the process above described the complete saccharification of the starch is effected in a shorter period of time than by other processes, the dough grows stiffer, is whiter, of better consistency and finer in texture.

When the dough made up as prescribed is placed in the trough to rise, a greater number of the starch groups are forced by the cerealine, the hydrolyzing agent in the flour, to combine with water, than in other processes, because of the fact that the processed compound is an intimate mixture of dextrose and gelatinized starch acting as a yeast food placed therein at the beginning of the dough process. Moreover, because a more complete saccharification of starch has been accomplished more dextrose has been developed in the dough during the period of fermentation, and as a natural consequence, a smaller proportion of yeast and sugar is required to bring about the proper degree of fermentation.

In my process, also a greater quantity of alcohol and volume of carbon dioxid gas are formed in a shorter period. This not only promotes expansion and fermentation but the excess of alcohol produced absolutely prevents souring during the baking process.

Bread made in this way has a crisper and better colored crust, and is whiter and closer in texture than ordinary bread. The loaves retain their moisture and remain in an edible condition longer and being much more free from mold may be shipped more readily to longer distances in a wider shipping zone.

I have given a specific formula for the making of a given quantity for pan baked bread but it will be understood that for use in making larger doughs and the various styles of bread baked in tins and on the hearth, in which the blend of soft winter and strong spring wheat flours vary greatly in their proportions in the blended flour mixture that the proportion of compound used in the dough ball and in the dough, as well as the other ingredients may be substantially varied.

The action and effect of the addition of the compound to the yeast is so active in promoting fermentation, that the quantity of yeast for a given quantity of water may be, in general, much reduced below the ordinary amount used.

What I claim is:

1. The process of making dough herein described, which consists in mixing water, yeast, a compound containing dextrose and gelatinized starch and salt and a small quantity of flour, permitting yeast culture to start in the mixture and adding the same to other ingredients for making up the dough.

2. The process of making dough herein described, which consists in making a dough ball with yeast, flour, dextrose, gelatinized starch and water, starting yeast culture in the same and then combining it with the other ingredients for making up the dough.

3. The process of making dough herein described, which consists in making up a dough ball of yeast, flour, dextrose, gelatinized starch and water, slitting and immersing the dough ball in water and after development of yeast culture therein, combining it with the other ingredients for making up the dough.

4. The process of making dough herein described, which consists in making up a mass of flour, yeast, a processed compound of farina and hominy, and water, starting yeast culture in the same and then adding it to the other ingredients for making up the dough.

5. The process of making dough herein described, which consists in preparing a mass of flour, yeast, a processed compound of equal parts of farina and hominy, and water, starting yeast culture in the same and then adding it to the other ingredients for making up the dough.

6. The process of making dough herein described, which consists in preparing a dough ball of flour, yeast, processed farina and hominy in substantially the proportions stated and water, slitting the top of the ball, immersing it in water, for a short period of time, then breaking it up and mixing it with the other ingredients for making up the dough.

7. The process of making dough herein described, which consists in making up a mass of flour, yeast, two starches of different fermenting periods and water, starting yeast culture in the same and then adding it to the other ingredients for making up the dough.

In testimony whereof I hereunto affix my signature in the presence of a subscribing witness.

THOMAS G. BLACKLOCK.

Witness:
FLORENCE LEVIEN.